Oct. 29, 1935.    W. B. BRONANDER    2,018,702
INTERNAL COMBUSTION ENGINE
Filed April 26, 1934
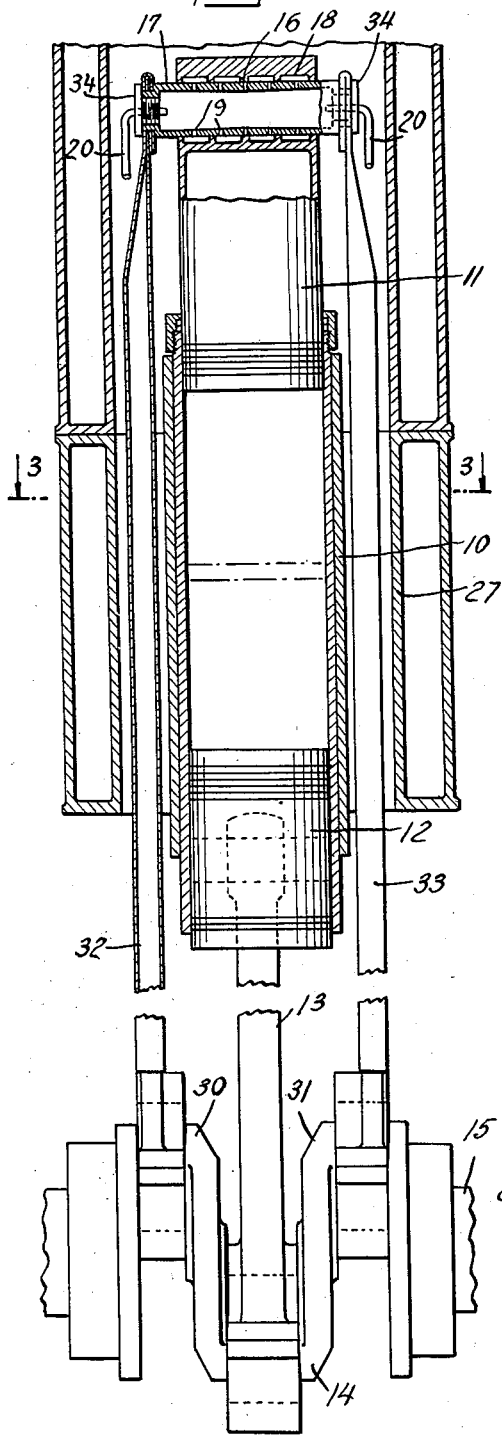
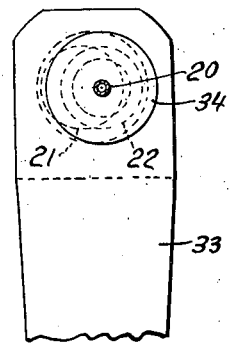
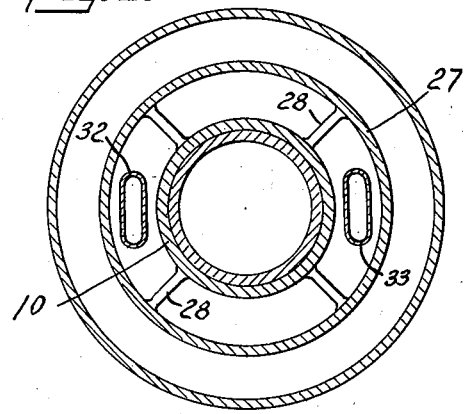
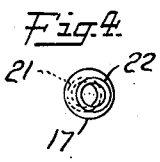
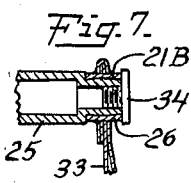
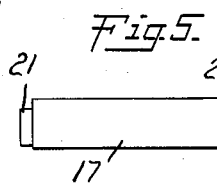
INVENTOR
Wilhelm B. Bronander
BY
Marshall & Hawley
ATTORNEYS Patented Oct. 29, 1935

2,018,702

UNITED STATES PATENT OFFICE 2,018,702

INTERNAL COMBUSTION ENGINE

Wilhelm B. Bronander, Montclair, N. J.

Application April 26, 1934, Serial No. 722,444

9 Claims. (Cl. 123—51)

This invention relates to internal combustion engines.

It is common in engines of the opposed piston type such as that shown in Bronander Patent No. 1,460,475 granted July 3, 1933, to provide two connecting rods between one of the pistons such as the upper piston in the vertical engine illustrated in the patent and the crank shaft. In the patent referred to the connecting rods are pivoted to a cross arm which in turn is pivoted to a bracket carried by the piston. This arrangement has not proven entirely satisfactory since upon wear lost motion takes place at the pivotal joints resulting in a noisy and inefficient operation.

This invention has for its salient object to provide a simple, practical and efficient connecting rod connection so constructed and arranged as to be self-equalizing and as to automatically and continually take up wear and prevent lost motion.

Further objects of the invention will appear from the following specification taken in connection with the drawing which forms a part of this application, and in which Fig. 1 is a longitudinal sectional elevation of a portion of an internal combustion engine showing a connecting rod connection constructed in accordance with the invention;

Fig. 2 is a side elevational view of the upper end of the connecting rod and the piston pin;

Fig. 3 is a transverse sectional elevation taken substantially on line 3—3 of Fig. 1 and looking in the direction of the arrows;

Fig. 4 is an end elevation of one of the piston pins;

Fig. 5 is an elevational view of a pin constructed in accordance with the invention;

Fig. 6 is a view similar to Fig. 5, but showing a slightly modified form of the invention; and Fig. 7 is a sectional elevation showing one end of a connecting rod connected to one end of the piston pin.

The invention briefly described consists of a connection between a pair of connecting rods and the ends of a cross pin carried by the piston, the connections between the rods and the pin being eccentrically disposed relative to each other. The eccentric connection of one of the connecting rods is diametrically opposite the connection between the other connecting rod and the other end of the piston. These oppositely disposed eccentric connections operate to automatically take up any wear and to prevent any lost motion between the connecting rods and the piston. The connections equalize the force transmitted from the upper piston assembly to the two connecting rods. In another form of the invention the connections between the connecting rods and the piston pin are not eccentrically disposed relative to each other, but the pin is eccentrically mounted in the piston.

Further details of the invention will appear from the following description.

In the particular embodiment of the invention illustrated in the drawing there is shown a portion of an engine comprising a cylinder 10 of any suitable construction having disposed therein a pair of oppositely acting pistons 11 and 12. The piston 12 is connected by a connecting rod 13 to a crank 14 on a crank shaft 15.

The piston 11 is provided with a transverse bore 16 adjacent the upper end thereof in which is mounted a hollow piston pin 17. Rollers 18 are shown between the piston pin 17 and the bore 16 and these may or may not be used. The piston pin is provided with a plurality of apertures 19 through which lubricant passes to the rollers 18 or to the bearing sleeve if no rollers are used. Oil is conducted to the interior of the hollow piston pin through suitable conduits 20.

The piston pin shown in Fig. 1 is illustrated more in detail in Figs. 4 and 5. The pin is cylindrical on its outer surface and is provided at its ends with offset bearing portions 21 and 22. These portions are disposed eccentric with relation to each other and also with reference to the longitudinal axis of the pin. The portions 21 and 22, as illustrated, are 180° apart and when the pin is mounted in the piston the offset portions 21 and 22 are offset in a horizontal plane.

The crank shaft 15 is provided with a pair of cranks 30 and 31 on which are mounted connecting rods 32 and 33, the other ends of the connecting rods being connected by plugs 34 to the ends of the piston pin 17. The upper ends of the connecting rods are mounted on the portions 21, 22 of the piston pin. The connecting rods may be of any desired form or shape and, as illustrated, are tubular in section, the upper ends being flattened and clamped between the flanges of the plugs 34 and the ends of the piston pin.

It will be evident from the above description that any wear on one of the journal portions 21 or 22 will be automatically compensated for by the eccentricity between these portions and that by reason of the construction described no extreme care or precision need be exercised in manufacturing the parts and any misalinement tending to cause undue friction between the rods and piston assembly will be neutralized and compensated for.

In the embodiment of the invention illustrated in Fig. 6 the bearing portions 21A and 21B are concentric on the center line C—D which is shown as dotted. The center line of the piston pin 25 shown in Fig. 6 is indicated by the full line E—F and it will be noted that this line is located at an angle to the line C—D. The portions 21A and 21B are arcuate or spherical, as shown in Fig. 7.

The connecting rods are connected to the portions 21A and 21B in the manner shown in Fig. 7 wherein it will be noted that a sleeve 26 is secured to the upper end of the connecting rod and is journaled on the bearing portion 21A and 21B.

The structure shown in Figs. 6 and 7 operates in a manner similar to the construction shown and described in the preceding figures to automatically maintain an efficient bearing contact between the connecting rods and pin and between the pin and piston.

The construction and mounting of the cylinder 10 is not material to this invention, but in Fig. 3 the cylinder is shown as connected to the jacket casing 27 by ribs 28.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What I claim is:

1. In an internal combustion engine, a cylinder, a piston, a piston pin, a crank shaft having a pair of cranks thereon, and a pair of connecting rods operatively connected to the cranks and eccentrically connected directly to the ends of the piston pin, the eccentricity of the connection of one connecting rod to the piston being opposed to the eccentricity of the connection between the other connecting rod and the piston.

2. In an internal combustion engine, a cylinder, a piston, a piston pin having end portions eccentric to the pin axis, a crank shaft having a pair of cranks thereon, and a pair of connecting rods operatively connected to the cranks and connected to the piston pin end portions, the eccentricity of one connection being disposed approximately 180° from the eccentricity of the other piston.

3. In an internal combustion engine, a cylinder, a piston, a pin carried by the piston, a crank shaft having a pair of cranks thereon, and a pair of connecting rods operatively connected to the cranks and eccentrically connected to the piston and pin, the rods being directly connected to the ends of the pin and the eccentricity of one connection being disposed approximately 180° from the eccentricity of the other piston.

4. In an internal combustion engine, a cylinder, a piston, a pin journaled in and disposed diametrically across the piston, a crank shaft having a pair of cranks thereon, and a pair of connecting rods operatively connected to the cranks and eccentrically connected to the piston and pin, the rods being directly connected to the ends of the piston pin.

5. In an internal combustion engine, a cylinder, a piston therein, a crank shaft, a cross pin mounted in the piston, a pair of connecting rods, one rod being connected directly to each end of said pin, said connections to the pin being offset relative to the longitudinal axis of the pin.

6. In an internal combustion engine, a cylinder, a piston therein, a crank shaft, a cross pin mounted in the piston, a pair of connecting rods, one rod being connected directly to each end of said pin, said connections to the pin being offset in opposite directions relative to the longitudinal axis of the pin.

7. In an internal combustion engine, a cylinder, a piston therein, a crank shaft, a cross pin mounted in the piston, a pair of connecting rods, one rod being connected directly to each end of said pin, said connections to the pin being offset relative to the longitudinal axis of the pin and offset approximately 180° relative to each other.

8. In an internal combustion engine, a cylinder, a piston therein, a crank shaft, a cross pin journaled in the piston, a pair of connecting rods, one rod being pivotally connected directly to each end of said pin by a spherical bearing, said connections to the pin being offset relative to the longitudinal axis of the pin.

9. In an internal combustion engine, a cylinder, a piston, a piston pin journaled in said piston and having end portions disposed in alinement with each other and on an axis at right angles to the longitudinal axis of the piston, the axis of the journaled portion of the piston pin being disposed at an angle to the axis of the end portions, a crank shaft having a pair of cranks thereon and a pair of connecting rods operatively connected to the cranks and directly connected to the end portions of the piston pin.

WILHELM B. BRONANDER.